United States Patent [19]

Aubel

[11] 4,391,294

[45] Jul. 5, 1983

[54] DUMP DELAY VALVE

[75] Inventor: John A. Aubel, Decatur, Ill.

[73] Assignee: Borg-Warner Corporation, Chicago, Ill.

[21] Appl. No.: 326,231

[22] Filed: Nov. 30, 1981

[51] Int. Cl.3 .......................... F16K 17/18; F02M 3/00

[52] U.S. Cl. .............................. 137/493.8; 137/513.7; 137/510; 137/DIG. 9; 123/339

[58] Field of Search ............... 123/320, 339, 341, 409, 123/411; 137/505, 513.3, 493.8, 513.7, 110; 91/443

[56] References Cited

U.S. PATENT DOCUMENTS

| | | | |
|---|---|---|---|
| 3,730,154 | 5/1973 | Vartanian | 123/117 A |
| 3,996,955 | 12/1976 | Kawabata | 137/116.5 |
| 4,010,721 | 3/1977 | Ludwig | 123/117 A |
| 4,079,750 | 3/1978 | Ludwig | 137/513.7 |
| 4,168,680 | 9/1979 | Kawai et al. | 123/103 R |

FOREIGN PATENT DOCUMENTS

| | | |
|---|---|---|
| 1036491 | 7/1966 | United Kingdom . |
| 1053411 | 1/1967 | United Kingdom . |
| 1269724 | 4/1972 | United Kingdom . |
| 1347753 | 2/1974 | United Kingdom . |

OTHER PUBLICATIONS

Pending U.S. Patent Appln. Nos.: 155,242 to Aubel, 155,241 to Aubel et al.

*Primary Examiner*—Martin P. Schwadron
*Assistant Examiner*—James R. Shay
*Attorney, Agent, or Firm*—Florian S. Gregorczyk

[57] ABSTRACT

A delay valve has a body defining an enclosure, with a separating plate and diaphragm operator therein to define an input, output and third chamber. The input and output chambers are adjacent, and separated by the separating plate. This plate defines an aperture, an umbrella valve opening and a port, all of which communicate between the input and output chambers. A stem and seal arrangement is affixed to and operable by the diaphragm operator against the bias force of a spring, to seal communication through the port at and above a pressure differential between the output and third chambers. As the input chamber vacuum decreases, the output chamber vacuum level likewise decays through the aperture at a relatively slow rate. When the pressure differential between the output and third chambers is inadequate to overcome the bias force of the spring, the port opens and thus produces equilibrium between the input and output chambers. This delay valve thus rapidly returns to an equilibrium position and is again ready to commence controlling without awaiting a slow decay return to equilibrium.

13 Claims, 4 Drawing Figures

FIG. 1
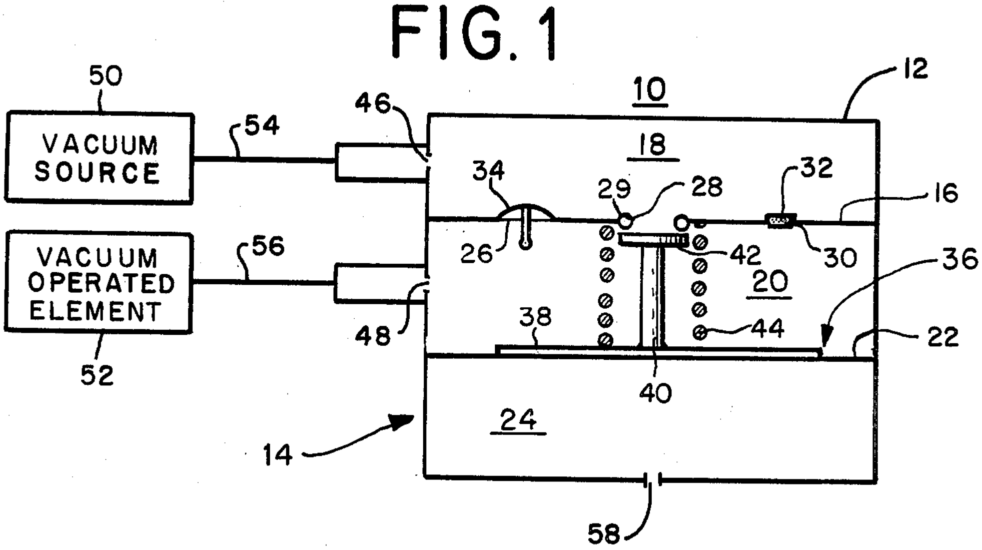
FIG. 2
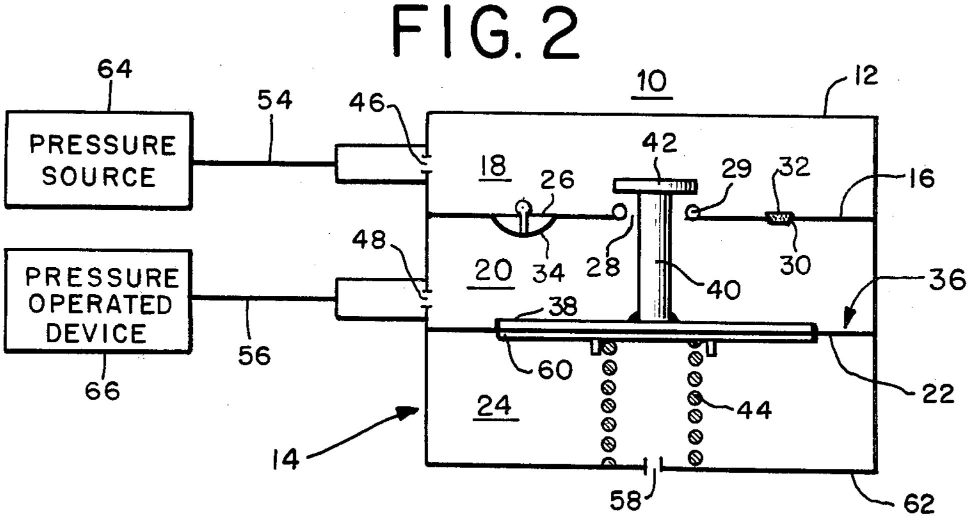
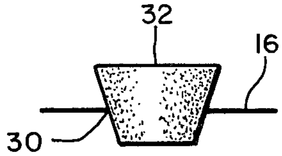
FIG. 3
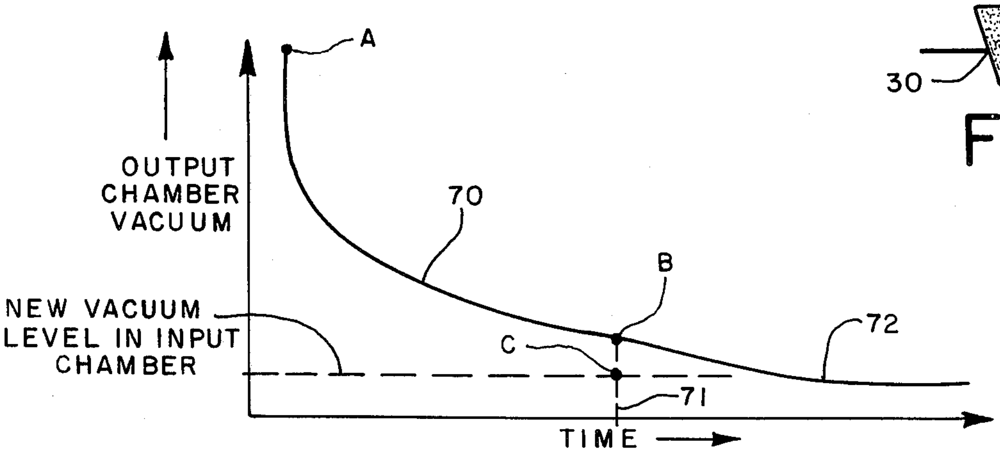
FIG. 4

DUMP DELAY VALVE

BACKGROUND OF THE INVENTION

This invention relates to a valve assembly generally used to control a vacuum motor in response to a vacuum or pressure signal from a monitored source. More specifically, this invention relates to a vacuum operated control system that utilizes a trapped vacuum which gradually decays through an orifice or porous plug during the time that the vacuum output level is greater than the input vacuum level.

In an automobile, delay valves are utilized to control various functions, such as vacuum advance, blend-air doors, thermactor air management systems, and other applications. Delay valves suitable for idle speed control were disclosed and claimed in U.S. patent applications having Ser. Nos. 155,241 and 155,242, both filed on June 2, 1980, and assigned to the assignee of this invention. These prior art delay valves have decay curves graphically illustrating that the vacuum level in an output chamber is decreasing (or increasing in an input chamber) as a function of time, if the chamber is sealed from further vacuum input at a level equal to or greater than that of the output chamber. This decay function is often so slow as to inhibit rapid actuation of a controlled element, such as a carburetor or air injection system of a vehicle. Therefore, a principal consideration of the present invention is to allow a normal, smooth vacuum decay from the output chamber and then, at a predetermined vacuum level, to rapidly balance the input and output vacuum levels in such valves.

When such a delay valve is mounted in an automobile, the undesirably slow decay of the vacuum operated delay valve can inhibit successful completion of the controlled operation. In some instances, such slow decay can create a secondary problem, such as the production of a resonant frequency effect in the controlled system which degrades the desired controlled operation and thus may produce mechanical noise or inhibit emission control.

SUMMARY OF THE INVENTION

A dump delay valve constructed in accordance with this invention has a body defining an enclosure with communicating ports and an aperture. A separating plate in the enclosure defines input and output chambers, and a diaphragm operator is located in the output chamber to define a third chamber, with the input and output chambers adjacent. The separating plate defines an aperture, an opening for an umbrella valve, and a port, all of which communicate between the input and output chambers when open. An umbrella valve is mounted on the separating plate to seal communication through the opening. The port opening and the aperture in the separating plate allow fluid communication at a fixed rate therethrough. A mounting plate is affixed to the diaphragm operator, and the separating plate port is sealed by a seal attached to a stem positioned in the output chamber, where the stem is affixed to the mounting plate and is operable by the diaphragm operator. A bias spring with a known bias force is positioned in the output chamber to bias the stem and seal toward the normally open position above the port. The valve body defines an input port communicating between a vacuum (pressure below atmospheric) source and the input chamber, and an output port from the output chamber, communicable with a vacuum operable device. The third chamber is maintained at atmospheric pressure through an aperture in the enclosure.

In accordance with this invention, a vacuum level in the output chamber greater than the bias force of the spring will actuate the diaphragm, stem and seal to close the port. Vacuum depression is introduced into the output chamber through the umbrella valve when the input vacuum is greater than the output vacuum. As the input vacuum decreases, the umbrella valve remains sealed as the input and output chambers communicate through the separating plate aperture or orifice to attain equilibrium. The rate of equilibrium attainment as a function of time is referred to as a decay function. As this decay function can be relatively slow it is desirable, in some cases, to provide a preset condition where immediate communication, and thus immediate vacuum level equilibrium, is provided between input and output chambers through the separating plate port. That point along the decay function where this immediate communication occurs is determined by the bias force of the spring.

THE DRAWINGS

In the several figures of the drawing, like reference numerals identify like components, and in the drawing:

FIG. 1 is a schematic illustration of a dump delay valve constructed according to the invention, and coupled to a vacuum source and a vacuum operated element;

FIG. 2 is a side view of another embodiment of a dump delay valve;

FIG. 3 is a cross-section illustration of a porous plug, which may be utilized as a restrictive flow control orifice in the separating plate aperture and/or port; and FIG. 4 is a graphical illustration of delay valve vacuum decay as a function of time.

DETAILED DESCRIPTION OF THE INVENTION

In FIG. 1 a dump delay valve 10 is shown with a wall structure 12, which, for example, can be of a hard plastic or formed metal, defining an enclosure 14 in which is mounted a separating plate 16 generally a portion of wall structure 12. Separating plate 16 in cooperation with the wall structure 12 defines an input chamber 18 and an output chamber 20. A diaphragm operator 22, generally of a flexible elastomer material such as rubber or plastic, mounted in output chamber 20 and generally parallel to separating plate 16, defines a third or atmospheric chamber 24, with output chamber 20 adjacent to input chamber 18.

Separating plate 16 defines an umbrella valve opening 26, a port 28 and a fixed orifice or aperture 30. A porous plug insert 32 may be mounted in orifice 30 to restrict the fluid flow through this orifice. Porous plug 32 is shown in an enlarged view in FIG. 3. Such plugs provide a predetermined flow-rate therethrough, and are utilized to serve in place of a fixed orifice. These porous plugs are manufactured of a sintered metal powder compact, such as stainless steel, with a known porosity. Opening 26, port 28 and fixed orifice 30 all communicate between input chamber 18 and output chamber 20. A raised seal seat 29, which is part of separating plate 16, is formed about port 28. An umbrella valve 34 is mounted on separating plate 16 over umbrella valve opening 26. This umbrella valve seals communication through opening 26 between input chamber 18 and output chamber 20 when a vacuum (i.e., a pressure below atmospheric pressure) in chamber 20 is greater than or equal to that vacuum in chamber 18. Fixed orifice 30 (or porous plug 32, when inserted in the orifice) communicates between input chamber 18 and output chamber 20 to allow a gradual, controlled rate of change of pressure or vacuum between chambers 18 and 20. Affixed to the output chamber face 36 of diaphragm operator 20 is a mounting plate 38 generally a metal element but not limited thereto. A stem 40 is positioned in output chamber 20 with a seal means 42 of a rubber or flexible elastomer affixed to one end, and having the opposite end affixed to mounting plate 38. Seal 42 and stem 40 are movable by diaphragm operator 22, so that seal 42 contacts port 28 to close this port against communication between input chamber 18 and output chamber 20. A bias spring 44, such as a coiled metal, is positioned in output chamber 20, between separating plate 16 and mounting plate 38, to maintain seal 42 and stem 40 in the open port position as shown in FIG. 1. Spring 40 can be selected to provide a bias force of any predetermined value down to 1 or 2 grams-force.

Wall 12 defines an input port 46 and an output port 48. Ports 46 and 48 are connected as shown to a vacuum source 50, such as a manifold vacuum line in an automobile engine, and vacuum operated element 52, such as the vacuum advance of an automobile engine, over connecting means 54 and 56, respectively. Thus input chamber 18 communicates with vacuum source 50 through port 46 and connecting means 54. Similarly, output chamber 20 communicates to vacuum-operated element 52 through port 48 and connecting means 56. Wall 12 also defines an aperture 58 between third chamber 24 and a reference pressure source. As shown, aperture 58 is open to atmosphere, but is capable of communication to any pressure source to maintain a fixed pressure level in third chamber 24.

FIG. 2 illustrates a pressure-operable device of the same type as the vacuum operable device of FIG. 1. In FIG. 2 elements similar to those shown in FIG. 1 are similarly numbered. In FIG. 2 stem 40 is affixed to mounting plate 38 in output chamber 20, but stem 40 extends through separating port 28 into input chamber 18, wherein seal 42 is mounted on the end thereof to contact seal seat 29 and close port 28 to prevent communication through port 28 between input chamber 18 and output chamber 20. A second mounting plate 60 is affixed to diaphragm operator 22, and is positioned in third chamber 24. In this chamber 24 wall structure 12 defines an end wall 62. Spring 44 is positioned between end wall 62 and mounting plate 60 to bias stem 40 and seal 42 to the normally-open position of port 28.

In this embodiment connecting means 54 and 56 are connected to a pressure source 64 and a pressure-operable device 66, respectively. Umbrella valve 34 is mounted on separating plate 16 in output chamber 20. Third chamber 24 is again at a reference pressure, generally atmospheric pressure.

The terms "input vacuum" or "input pressure" refer to that vacuum or pressure level present in input chamber 18, recognizing that it is dependent upon the vacuum source 50 or pressure source 64 for such level. Similarly, "output vacuum" or "output pressure" refers to that vacuum or pressure level in output chamber 20; the maximum amplitude of vacuum or pressure level cannot exceed the maximum amplitude of that attained in the input chamber.

OPERATION

The dump delay valve 10 is shown in FIG. 1 in the normally open position, that is, with port 28 open between input chamber 18 and output chamber 20. Port seal 42 is urged into this open position by bias spring 44, and third chamber 24 is at atmospheric pressure. When a vacuum is introduced into input chamber 18 from a suitable vacuum source 50, such as the engine manifold in an automobile, it is communicated to chamber 20 through port 28 and umbrella valve 26. As orifice 30 is open between chambers 18 and 20 there is also communication through this orifice, but at a negligible rate as compared to flow through port 28 and valve 34. Umbrella valve 34 in FIG. 1 opens when the vacuum in input chamber 18 is greater than the vacuum in output chamber 20.

When the vacuum level in chamber 20 is such that the pressure differential between chamber 20 and third chamber 24 (which is at atmospheric pressure) is great enough to overcome the predetermined bias force of spring 44, diaphragm operator 22 actuates stem 40 and seal 42 to contact seal seat 29 and stop communication through port 28. If a further vacuum depression exists from vacuum source 50 to input chamber 18 it will communicate through umbrella valve 34 with opening 26, as well as through orifice 30. When the input and output chambers are at the same vacuum level, umbrella valve 34 seals communication through opening 26 from chamber 18 to chamber 20.

As the vacuum level in input chamber 18 is reduced, such as from a decrease in manifold vacuum in an automobile, that is, as the absolute pressure increases toward atmospheric pressure, there is a fluid flow through orifice 30 to balance the vacuum level between chambers 18 and 20. This flow through orifice 30 continues as long as (a) the vacuum level in chamber 20 is greater than that in chamber 18, and (b) the pressure differential between output chamber 20 and third chamber 24 is great enough to actuate diaphragm operator 22 to overcome bias spring 44. At that pressure differential between output chamber 20 and third chamber 24 where diaphragm operator 22 will no longer overcome the bias force of spring 44, seal 42 and stem 40 are moved to open port 28 for immediate communication, and therefore equilibrium, between chambers 18 and 20. Port 28 will be opened at a pressure differential predetermined by the bias force of spring 44.

The rate of flow or decrease in the vacuum level in output chamber 20 through orifice 30 as a function of time is referred to as the decay of vacuum. This decay function is graphically illustrated in FIG. 4 as a curve 70. In FIG. 4 the abscissa represents time and the ordinate denotes the vacuum level in output chamber 20 in pressure depression below atmosphere (vacuum). As shown, the decreasing decay function starts from a point A representing the largest vacuum in input chamber 18, which is generally where input chamber 18 vacuum equals output chamber 20 vacuum. From point A to point B curve 70 depicts the decay or decreases of the vacuum in output chamber 20 through orifice 30. This decrease occurs after separating plate port 28 has been sealed by sealing means 42 and by the accompanying sudden removal or rapid decrease of the vacuum level in input chamber 18. At point B the pressure differential between output chamber 20 and third chamber 24 is no longer great enough to actuate diaphragm operator 22 against the bias force of spring 44, which lifts seal 42 off seat 29. Thus port 28 is open to communication between chambers 18 and 20 and a vacuum level equilibrium between these chambers is attained at point C on curve 71, depicting the sharp change of output-chamber vacuum after seal 42 is moved off port 28. This equilibrium is achieved almost instantaneously as port 28 is larger, by orders of magnitude, than orifice 30 (or its equivalent when a porous plug 32 is inserted therein).

As shown in FIG. 4 by the extension 72 of the curve 70, if port 28 were maintained closed, eventually equilibrium between the vacuum levels in chambers 18 and 20 would be obtained through the continued slow decay through orifice 30. The relative slope of the decay curve can be altered by a change in the size of orifice 30, or insertion of an alternative plug 32. The location of point C is dependent upon the bias force of spring 44, and can be shifted along the curve 70 by changing the spring 44 force.

The embodiment in FIG. 2 shows a pressure-operable dump delay valve similar to that of the vacuum operable valve of FIG. 1. Valve 10 is shown in a reference or normally open position and third chamber 24 is at atmospheric pressure. As a fluid pressure is introduced into input chamber 18 from pressure source 64 through connecting means 54 and port 46, it is communicated to output chamber 20 through umbrella valve opening 26, port 28 and orifice 30. Communication through orifice 30 is very small as compared to either port 28 or umbrella valve opening 26 when they are open. As long as the pressure level in input chamber 18 is greater than the pressure in output chamber 20 umbrella valve 34 remains open. The fluid pressure from pressure source 64 and output chamber 20 is communicated to pressure operable device 66 through output port 48 and connecting means 56. When the pressure differential between output chamber 20 and third chamber 24 is great enough to actuate diaphragm 22 to overcome the bias force of spring 44, seal 42 contacts seat 29 to close communication through port 28. Pressure communication past umbrella valve 34 continues until the pressure in input chamber 18 equals the pressure in output chamber 20. Should the pressure level in input chamber 18 decrease after port 28 is sealed, umbrella valve 34 remains closed and the input chamber 18 and output chamber 20 will seek equilibrium through orifice 30. As the pressure decays through orifice 30, it follows a curve similar in shape to that of FIG. 4, until the pressure difference between output chamber 20 and third chamber 24 is no longer large enough to actuate diaphragm operator 22 against the bias force of spring 44; this occurs at point C. At that point, stem 40 and seal 42 will be moved to the normally open position, and communication through port 28 will produce equilibrium between input chamber 18 and output chamber 20.

This allowance for the rapid balance or equilibrium between the input and output chambers is a major improvement over present delay valves. As the decay rate proceeds the vacuum operated device is in a waiting mode, that is, awaiting the vacuum balance between input and output chambers 18 and 20. During this delay valve lull or neutral period, no change occurs in the operating device connected to the output port 48, and in an automobile engine those engine functions dependent upon this vacuum operable device are also in a holding condition. In at least one specific application of such a delay valve, the failure to make such a rapid change at a predetermined point causes an air injection system to attain what can approximately be termed a resonant frequency effect, which dramatically inhibits its operation, producing mechanical noise and increasing undesirable exhaust emissions.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. A dump delay valve, comprising:

a wall structure defining an enclosure, a separating plate mounted in said enclosure, defining an input chamber and an output chamber, which separating plate defines a port, an aperture and an umbrella valve opening between the input and output chambers, an umbrella valve mounted in said input chamber on the separating plate, to cover said umbrella valve opening, a diaphragm operator, mounted in the output chamber defining a third chamber, with the output chamber adjacent the separating plate, which diaphragm operator separates and seals the output and third chambers from each other, a mounting plate affixed to the diaphragm operator in said output chamber, said wall structure defining an input port for the input chamber, an output port for the output chamber, and an aperture to communicate said third chamber to atmosphere, a stem positioned in the output chamber, which stem is affixed to said mounting plate and operable by the diaphragm operator, a seal means affixed near one end of the stem and positioned to abut said separating plate port, and a bias spring with a known bias force, positioned in the output chamber to bias the diaphragm operator and stem to open the separating plate port when the pressure difference between the output and third chambers is less than the bias force of the spring.

2. A dump delay valve as claimed in claim 1, in which the separating plate aperture is a fixed orifice.

3. A dump delay valve as claimed in claim 1, and further comprising a porous plug mounted in the separating plate aperture to thereby allow a restricted fluid flow between the input and output chambers.

4. A dump delay valve as claimed in claim 1, wherein the seal means operates in the output chamber and the umbrella valve in said input chamber opens to communicate with said output chamber.

5. A dump delay valve as claimed in claim 4, which valve is responsive to a decreasing vacuum input to open said separating plate port when input vacuum is less than output vacuum, and the bias spring force is greater than the pressure differential between the third chamber and the output chamber.

6. A dump delay valve as claimed in claim 4, which valve operates when said seal means closes communication through said separating plate port to allow a controlled rate of fluid flow and pressure increase from the input chamber to the output chamber, from a first pressure depression in said output chamber up to a smaller pressure depression in said input chamber, at which pressure depression said bias spring is operative to bias open said seal means to thereby instantaneously balance the pressure in said input and output chambers at a predetermined pressure depression below atmospheric pressure.

7. A dump delay valve as claimed in claim 1, wherein said seal means is operable under urging of the bias spring to instantaneously open and communicate between the input and output chambers, where said bias spring has a force greater than or equal to the difference between atmospheric pressure and the pressure level in the output chamber.

8. A dump delay valve as claimed in claim 1, wherein a porous plug is inserted in the separating plate port to control the rate of change of the difference between the fluid pressures in the input and output chambers.

9. A dump delay valve, comprising:

a wall structure defining an enclosure, a separating plate mounted in said enclosure and defining an input chamber and an output chamber, which separating plate defines a port, an aperture and an umbrella valve opening between the input and output chambers, an umbrella valve mounted in said output chamber on the separating plate, to cover and seal said umbrella valve opening, a diaphragm operator having two flat surfaces, mounted in the output chamber to define a third chamber, with the output chamber adjacent the separating plate, which diaphragm operator separates and seals the output and third chambers from each other, a pair of mounting plates, one affixed to each flat surface of the diaphragm operator, said wall structure defining an input port for the input chamber, an output port for the output chamber, and an aperture to communicate said third chamber to atmosphere, a stem positioned in the output chamber and affixed to one of said diaphragm operator mounting plates, and extending through said separating plate port into said input chamber, a seal means affixed at the end of said stem and positioned to abut said separating plate port, a bias spring with a known force, positioned in the third chamber, and said wall structure defining an end wall, between which end wall and second mounting plate of the diaphragm operator the bias spring is positioned to bias said diaphragm operator and stem to open the separating plate port when the pressure difference between the output chamber and the third chamber, operable on the diaphragm operator, is less than the bias force of said spring.

10. A dump delay valve as claimed in claim 9, wherein the separating plate aperture is a fixed orifice.

11. A dump delay valve as claimed in claim 9, and further comprising a porous plug mounted in the separating plate aperture to thereby allow a restricted fluid flow between input and output chambers.

12. A dump delay valve as claimed in claim 9, wherein the seal means is operative in the input chamber and the umbrella valve in said output chamber opens to communicate with said input chamber.

13. A dump delay valve as claimed in claim 12, which valve operates to allow a controlled rate of pressure decrease from a first elevated pressure output level above atmospheric pressure down to a second elevated pressure above atmospheric pressure in said output chamber, where said bias spring is operative to bias open said seal means to thereby instantaneously balance the pressure in said input and output chambers.

* * * * *